United States Patent [19]

Asanuma et al.

[11] Patent Number: 5,448,481
[45] Date of Patent: Sep. 5, 1995

[54] CONTROL SYSTEM FOR A FRONT AND REAR WHEEL STEERING VEHICLE

[75] Inventors: Nobuyoshi Asanuma; Kiyoshi Wakamatsu; Manabu Ikegaya, all of Saitama, Japan

[73] Assignee: Honda Giken Kogyo Kabushiki Kaisha, Tokyo, Japan

[21] Appl. No.: 161,139

[22] Filed: Dec. 2, 1993

[30] Foreign Application Priority Data

Dec. 2, 1992 [JP] Japan .................................. 4-350490

[51] Int. Cl.$^6$ ............................................. B62D 5/04
[52] U.S. Cl. .............................. 364/424.05; 180/140; 180/142; 180/79.1
[58] Field of Search ...................... 364/426.01, 426.02, 364/426.03, 424.05; 180/197, 140, 141, 142, 143, 79.1

[56] References Cited

U.S. PATENT DOCUMENTS

| | | | |
|---|---|---|---|
| 4,412,594 | 11/1983 | Furukawa et al. | 180/140 |
| 4,834,205 | 5/1989 | Mizuno et al. | 180/141 |
| 4,842,089 | 6/1989 | Kimbrough et al. | 180/79.1 |
| 4,878,557 | 11/1989 | Shibahata et al. | 180/140 |
| 4,971,173 | 11/1990 | Takahashi | 180/140 |
| 5,155,686 | 10/1992 | Shiraishi et al. | 364/426.03 |
| 5,228,757 | 7/1993 | Ito et al. | 303/100 |
| 5,251,135 | 10/1993 | Serizawa et al. | 364/424.05 |
| 5,267,160 | 11/1993 | Ito et al. | 364/424.05 |
| 5,274,555 | 12/1993 | Fukunaga et al. | 364/424.05 |
| 5,313,389 | 5/1994 | Yasui | 364/424.05 |

FOREIGN PATENT DOCUMENTS

57-44568 3/1982 Japan .

*Primary Examiner*—Kevin J. Teska
*Assistant Examiner*—Susan Wieland
*Attorney, Agent, or Firm*—Irving M. Weiner; Joseph P. Carrier; Pamela S. Burt

[57] ABSTRACT

A steering angle of rear wheels are steered according to a deviation between an ideal yaw rate response and an actual yaw rate response to the given steering wheel input. By combining feedback control and feed forward control, immunity from external disturbances and lateral stability can be both ensured each at a high level over the entire range of vehicle speed. By appropriately selecting the transfer function of the control system, it is possible to achieve desired responsiveness and stability. Furthermore, the vehicle response in the range where the cornering force of tires tends to saturate can be improved, and it is therefore possible to neutralize the steering property over the entire vehicle speed range.

10 Claims, 7 Drawing Sheets

CONTROL SYSTEM FOR A FRONT AND REAR WHEEL STEERING VEHICLE

TECHNICAL FIELD

The present invention relates to a control system for a front and rear wheel steering vehicle, and in particular to an electronic control system for a front and rear wheel steering vehicle which can optimize the dynamic property of the vehicle even in the presence of external disturbances and changes in the operating conditions of the vehicle.

BACKGROUND OF THE INVENTION

It was previously proposed to detect the lateral acceleration or the yaw rate of a vehicle, and improve the dynamic property of the vehicle by steering the rear wheels appropriately (refer to Japanese patent laid open publication No. 57-44568).

According to this prior patent publication, the system is not able to distinguish between the yaw rate produced by the turning maneuver of the vehicle and the yaw rate produced by such external disturbances as side wind, and, therefore, it was not possible to achieve both a satisfactory immunity against external disturbances and a favorable maneuverability because the rear wheels are steered according to the yaw rate produced without regard to the cause of the yaw rate.

It is conceivable to change the yaw rate gain according to the vehicle speed so that a desired maneuverability may be obtained in a low speed range and a sufficient immunity against external disturbances may be obtained in a high speed range. However, such a speed dependent change in the vehicle response tends to cause some discomfort to the vehicle operator.

BRIEF SUMMARY OF THE INVENTION

In view of such problems of the prior art, a primary object of the present invention is to provide a control system for a front and rear wheel steering vehicle which can optimize the dynamic property of the vehicle by steering the rear wheels in an appropriate fashion without regard to the presence of external disturbances and changes in the operating conditions of the vehicle.

A second object of the present invention is to provide a control system for a front and rear wheel steering vehicle which can optimize the dynamic property of the vehicle by steering the rear wheels in an appropriate fashion without causing any out of ordinary impression or discomfort to the vehicle operator.

These and other objects of the present invention can be accomplished by providing a control system for a front and rear wheel steering vehicle having front wheels which are steered by turning of a steering wheel, and rear wheels which are automatically steered by a powered actuator according to an operating condition of the vehicle comprising: standard yaw rate determining means for determining a standard yaw rate according to a steering angle of the steering wheel; actual yaw rate detecting means for detecting an actual yaw rate acting upon the vehicle; computing means for computing a deviation between the standard yaw rate and the actual yaw rate and feedback control means for controlling a steering angle of the rear wheels according to the deviation computed by the computing means.

Thus, the rear wheels are steered so that an ideal yaw rate may be produced in response to a steering input, and it is possible to achieve both a desirable maneuverability of the vehicle and an improved immunity against external disturbances can be achieved.

According to a preferred embodiment of the present invention, there is provided a feed forward control means for controlling, in cooperation with the feedback control means, the steering angle of the rear wheels according to the steering angle of the steering wheel. Preferably, the feed forward control means is adapted to compensate for a transfer function of the standard yaw rate determining means. Provision of the feed forward control means improves the responsiveness of the vehicle. The feedback control contributes to the stabilization of the system.

Thus, according to a preferred embodiment of the present invention, a gain of a transfer function of the deviation with respect to the standard yaw rate is relatively small in a low frequency range, and a gain of a transfer function of the actual yaw rate with respect to the standard yaw rate is relatively small in a high frequency range.

Preferably, the feed forward control means produces an output which steers the rear wheels in opposite phase to the front wheels when the steering angle of the steering wheel is greater than a certain level so that the maneuverability of the vehicle can be improved in the nonlinear range of the cornering force of the tires. By reducing a gain of the standard yaw rate determining means when a lateral acceleration is greater than a certain level, the high speed turning capability of the vehicle can be improved.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
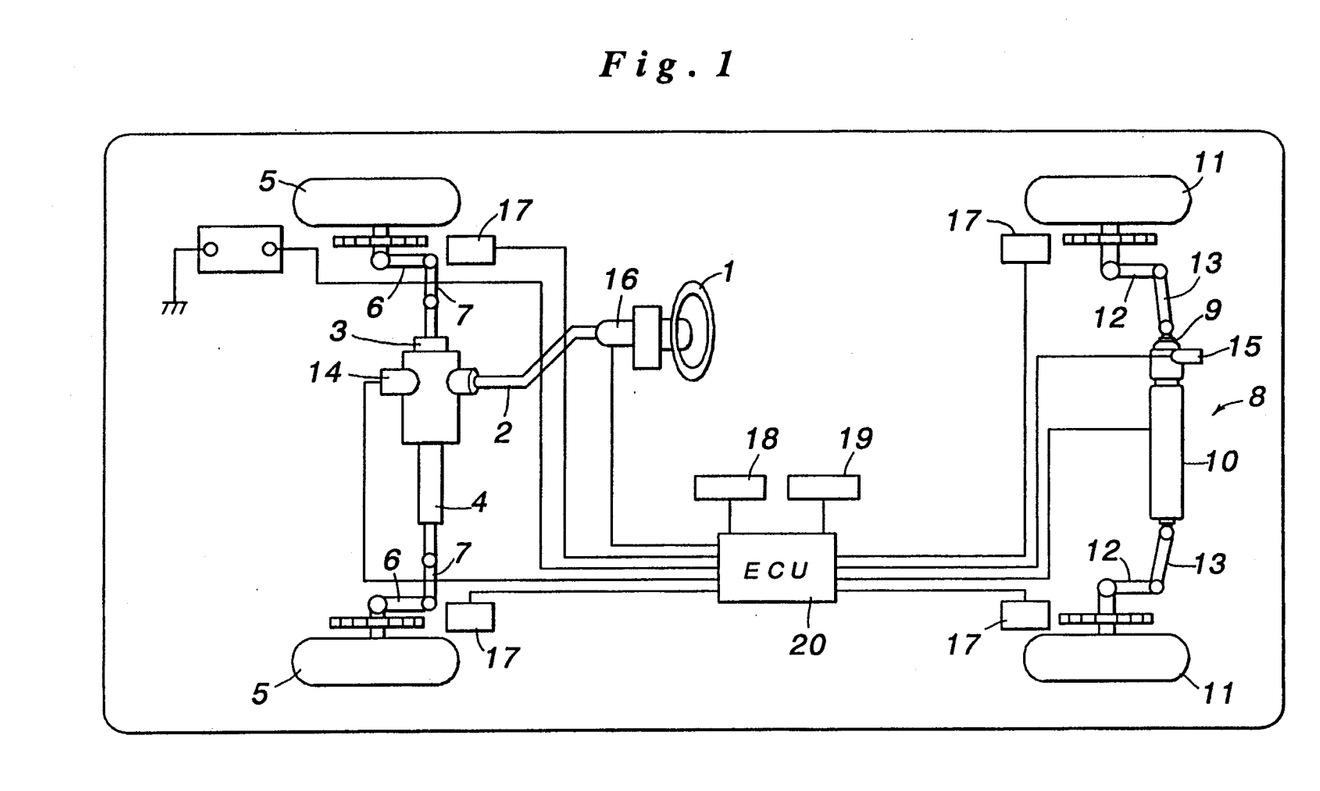
FIG. 1 is a schematic diagram of the front and rear wheels steering vehicle to which the present invention is applied.

FIG. 1 shows the overall structure of a front and rear wheel steering system to which the present invention is applied. A steering wheel 1 is securely attached to an upper end of a steering shaft 2 which is in turn mechanically connected to a steering rod 4 of a front wheel steering device 3 extending laterally with respect to the vehicle body. Two ends of this steering rod 4 are connected to knuckle arms 6 of wheel carriers for right and left front wheels 5 via tie rods 7.

A rear wheel steering device 8 is mounted on a rear part of the vehicle, and is adapted to actuate a steering rod 9 extending laterally with respect to the vehicle body by using an electric motor 10. Two ends of the steering rod 9 are connected, in much the same way as the steering rod 4 for the front wheels 5, to knuckle arms 12 of wheel carriers for right and left rear wheels 11 via tie rods 13.

The front and rear wheel steering devices 3 and 8 are provided with steering angle sensors 14 and 15 for detecting the steered angles of the front and rear wheels 5 and 11 by detecting the positions of the steering rods 4 and 9, respectively. The steering shaft 2 is provided with a steering angle sensor 16 which detects the steered angle of the steering wheel 1. The front and rear wheels 5 and 11 are provided with vehicle speed sensors 17 for detecting the vehicle speed, and a lateral acceleration sensor 18 and a yaw rate sensor 19 are mounted on suitable locations of the vehicle body.

These sensors 14 through 19 are electrically connected to a computer unit 20 which controls the operation of the electric motor 10.

When a vehicle operator turns the steering wheel 1, the steering rod 4 of the front wheel steering device 3 is mechanically actuated, and steers the front wheels 5. At the same time, the rotational angle of the steering wheel 1 and the displacement of the steering rod 4 are detected by the corresponding sensors 16 and 14, and transmitted to the computer unit 20. Based on the steering angle of the front wheels 5, the vehicle speed, the lateral acceleration, and the yaw rate detected by the corresponding sensors 14 through 19, the computer unit 20 determines the optimum steering angle of the rear wheels 11, and actuates the electric motor 10 so as to actually steer the rear wheels to the optimum angle.

The control flow in the computer unit 20 is described in the following with reference to FIGS. 2 and 3.

First of all, the steering angle $\theta$ of the steering wheel 1 is read (step 1). The vehicle speed V is read, and is smoothed out by taking a moving average (step 2). Then, the lateral acceleration G is read, and is 10 likewise smoothed out either by taking a moving average or by using a low-pass filter (step 3).

Figure 4A:
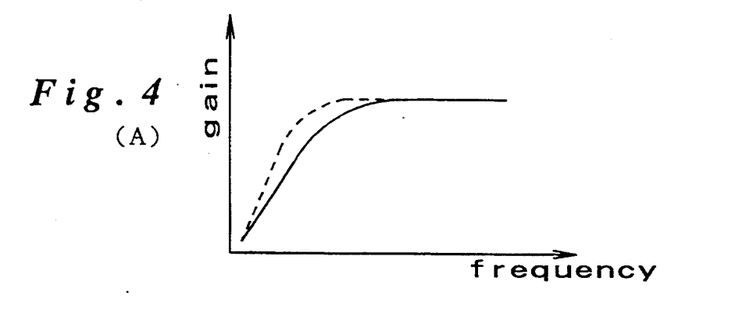
FIGS. 4A, 4B and 4C are graphs showing the properties of the drift compensation circuit for the yaw rate sensor.
Figure 4B:
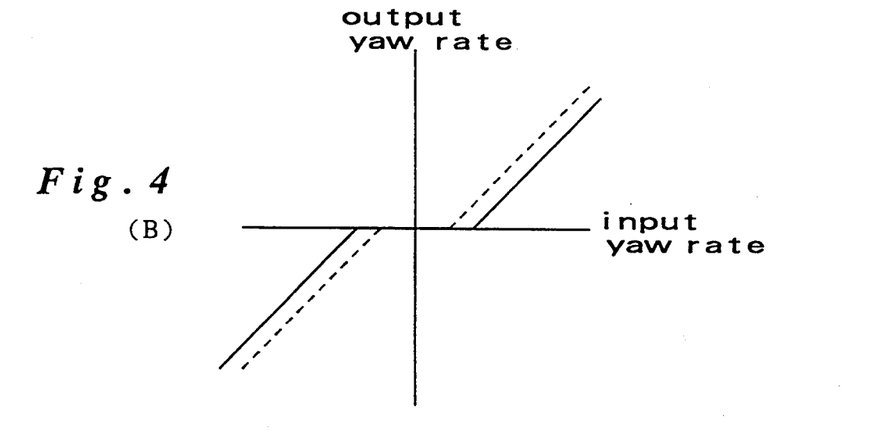
Figure 4C:
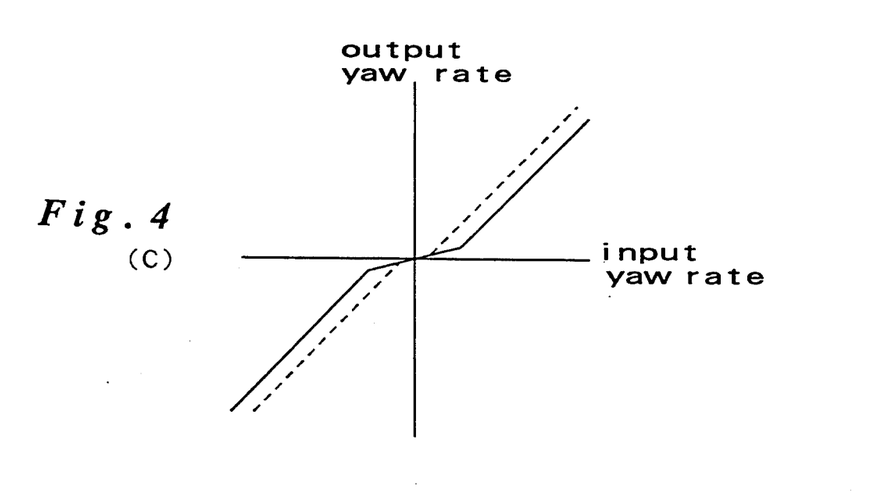

The yaw rate $\gamma$ is read. Due to the intrinsic property of the yaw rate sensor, the yaw rate signal inevitably involves some zero drift. Therefore, the yaw rate signal is processed by a high-pass filter circuit which lowers its cut-off frequency with the increase in the vehicle speed (refer to FIG. 4A), a dead band circuit which narrows the width of its dead band with the increase in the vehicle speed (refer to FIG. 4B), and a nonlinear circuit whose gain in a nonlinear region approaches an approximately linear unity gain with the increase in the vehicle speed (refer to FIG. 4C) to obtain a controlled yaw rate free from any drift component (step 4). This speed dependency is indicated in these graphs by showing the low speed properties in solid lines and high speed properties in dotted lines. Therefore, as the vehicle speed increases, the corresponding properties gradually shift from the solid lines to the dotted line.

An ideal yaw rate $\gamma_m$ (standard yaw rate) for the given steering wheel steering angle $\theta$ is computed from a mathematical function (Equation (1)) which also accounts for the vehicle speed V and the lateral acceleration G (step 5), and a deviation $\gamma_e$ of the controlled (actual) yaw rate $\gamma_c$ from this standard yaw rate $\gamma_m$ is computed (step 6). The standard yaw rate may be considered as a normal yaw rate which the vehicle operating in a normal fashion is expected to produce.

$$\gamma_m = 1/(S/2\pi f1 + 1) \cdot (k1(G) \cdot k2(V))/(S/2\pi f2(V) + 1) \cdot \theta \quad (1)$$

where f1 and f2 are cut-off frequencies.

The yaw rate $\gamma$ in an ideal condition free from any external disturbances is given as a mathematical function of the steering angle $\theta$ of the steering wheel. Therefore, the feed forward controlled variable in the ideal condition should be given as follows.

$$\gamma = Pm \cdot \theta \quad (2)$$

where Pm is the transfer function of the standard yaw rate set up unit. This is a condition in which the standard yaw rate and the actual yaw rate may be made to agree with each other without carrying out any feed forward control.

However, in reality, there is a dynamic and complicated relationship between the angular movement of the steering wheel and the resulting yaw rate of the vehicle due to the intervention of a steering device and other factors which may be described by a suitable transfer function, and this must be accounted for. Therefore, the feed forward controlled variable #1 is computed by taking into account this transfer function (step 7).

The yaw rate in this feed forward control system can be represented by the following equation.

$$\gamma = \theta \cdot Ng \cdot Pf + \theta \cdot Cf \cdot Cg \cdot Pg \cdot Pr \quad (3)$$

where Ng=gear ratio of the front wheel steering device; Pf=actual transfer function between the steering angle of the steering wheel and the yaw rate of the vehicle; Cf=transfer function of the feed forward control unit #1; Cg=transfer function of the gear box phase delay compensation unit; Pg=the transfer function of the rear wheel steering device; and Pr=actual transfer function between the steering angle of the rear wheels and the yaw rate of the vehicle.

Therefore, from Equations (2) and (3), the following relation holds.

$$Pm = Ng \cdot Pf + Cf \cdot Cg \cdot Pg \cdot Pr$$

Therefore, if the transfer function of the feed forward control unit #1 is determined so that $$Cf = (Pm - Ng \cdot Pf)/(Cg \cdot Pg \cdot Pr),$$

the standard yaw rate and the actual yaw rate may be made to agree with each other without involving any feedback control.

Figure 5:
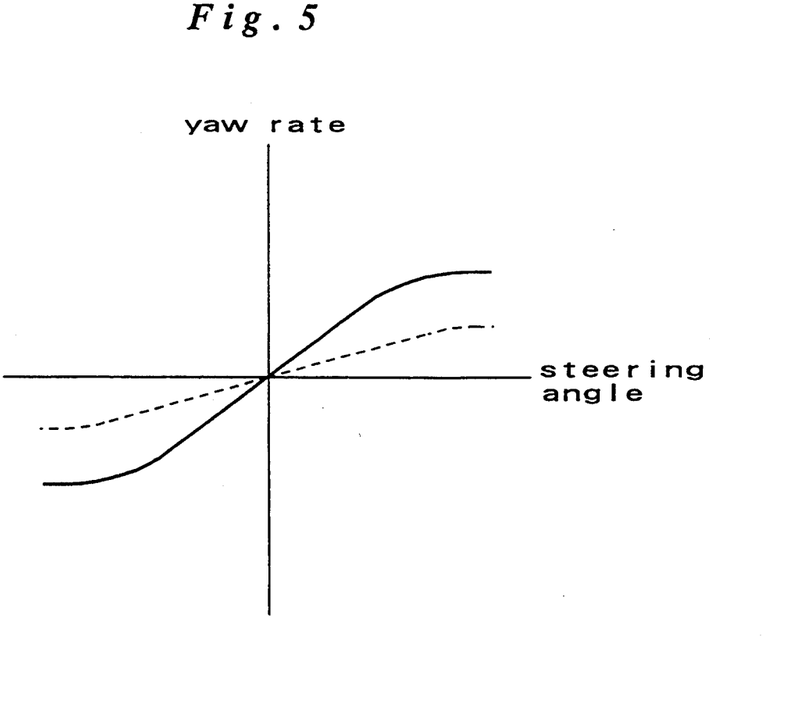
FIG. 5 is a graph showing the relationship between the yaw rate gain and the steering wheel steering angle.
Figure 6:
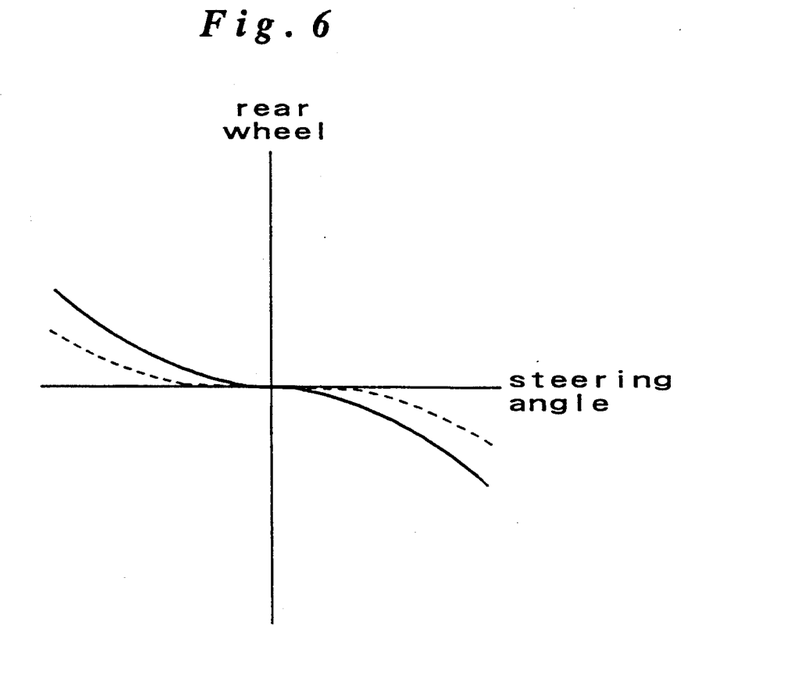
FIG. 6 is a graph showing the relationship between the steering wheel steering angle and the rear wheel steering angle.

Meanwhile, as the steering angle increases beyond a certain value, the cornering force of the tires becomes saturated, and this saturation occurs earlier as the vehicle speed increase. Therefore, the relationship between the steering angle of the steering wheel and the yaw rate becomes increasingly nonlinear as the steering angle increases and as the vehicle speed increases. In particular, the property of the vehicle approaches the property expressed by the dotted line in FIG. 5 or, in other words, the understeer tendency of the vehicle becomes more pronounced as the vehicle speed is increased. To achieve a brisk response of the yaw rate in a large steering angle range, a feed forward controlled variable #2 is computed for giving a reverse phase steering angle to the rear wheels according to the current steering wheel steering angle (step 8). By doing so, the nonlinearity shown in FIG. 5 is mitigated.

The two feed forward controlled variables thus obtained are added up (step 9), and a limit is imposed upon this sum according to the vehicle speed (step 10).

When there is no deviation between the standard yaw rate and the actual yaw rate, a desired yaw rate property of the vehicle can be achieved solely by the above described feed forward control. However, since the transfer function changes depending on the weight of the vehicle and the property of the tires used, it is difficult to define the standard yaw rate without substantial errors. Also, external disturbances such as road conditions and side wind which are highly unpredictable affect the standard yaw rate. Therefore, these factors must be compensated by feedback control.

Thus, a feedback controlled variable is computed according to the deviation between the standard yaw rate and the actual yaw rate so as to make the vehicle response agree with the standard yaw rate (step 11), and an appropriate limit is imposed upon the feedback controlled variable (step 12).

Figure 7:
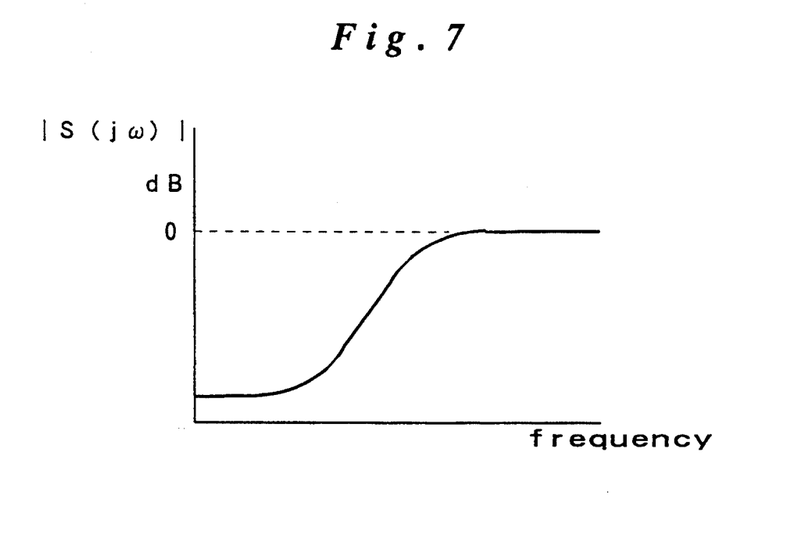
FIG. 7 is a graph showing the frequency response of the yaw rate deviation output with respect to the standard yaw rate input.
Figure 8:
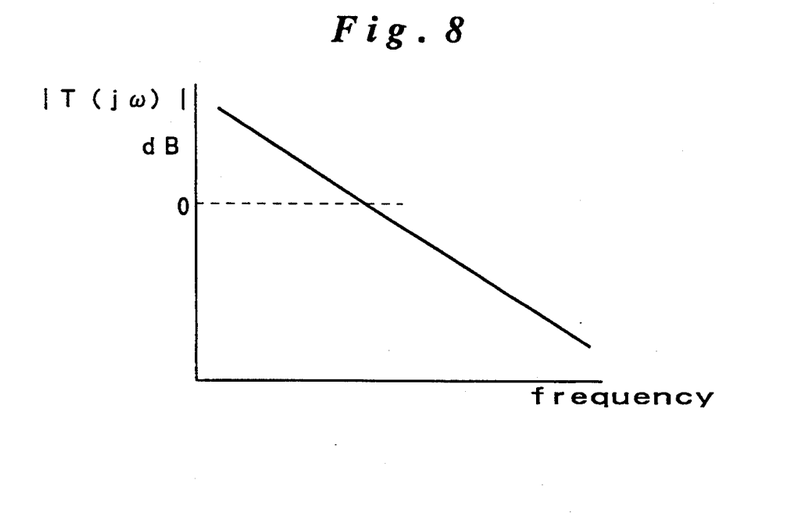
FIG. 8 is a graph showing the frequency response of the yaw rate output with respect to the standard yaw rate input.

In view of reducing the influences of external disturbances, and improving the robustness of the system, the transfer function $S(j\omega)$ between the standard yaw rate input and the deviation output, and the transfer function $T(j\omega)$ between the standard yaw rate input and the actual yaw rate output are desired to be as small as possible. However, these two transfer functions are related with each other so that $S(j\omega)+T(j\omega)=1$, and one of them cannot be reduced without increasing the other. Therefore, by noting the fact that external disturbances mainly consist of low frequency components while noises mainly consist of high frequency components, the reduction of influences from external disturbances and the improvement in the robustness of the system can be both achieved at a relatively high level by setting the transfer functions according to the frequency distribution of the detected yaw rate signal as shown in FIG. 7 and 8. More specifically, in a low frequency range (which is normally produced when the vehicle is travelling straight ahead), the output responsiveness of the deviation is reduced for the purpose of reducing the influences of side wind and ruts in the road (refer to FIG. 7). In a high frequency range, the output responsiveness of the actuator is reduced so that an excessive vehicle response may be controlled, and an improved yaw rate convergence can be achieved.

Figure 2:
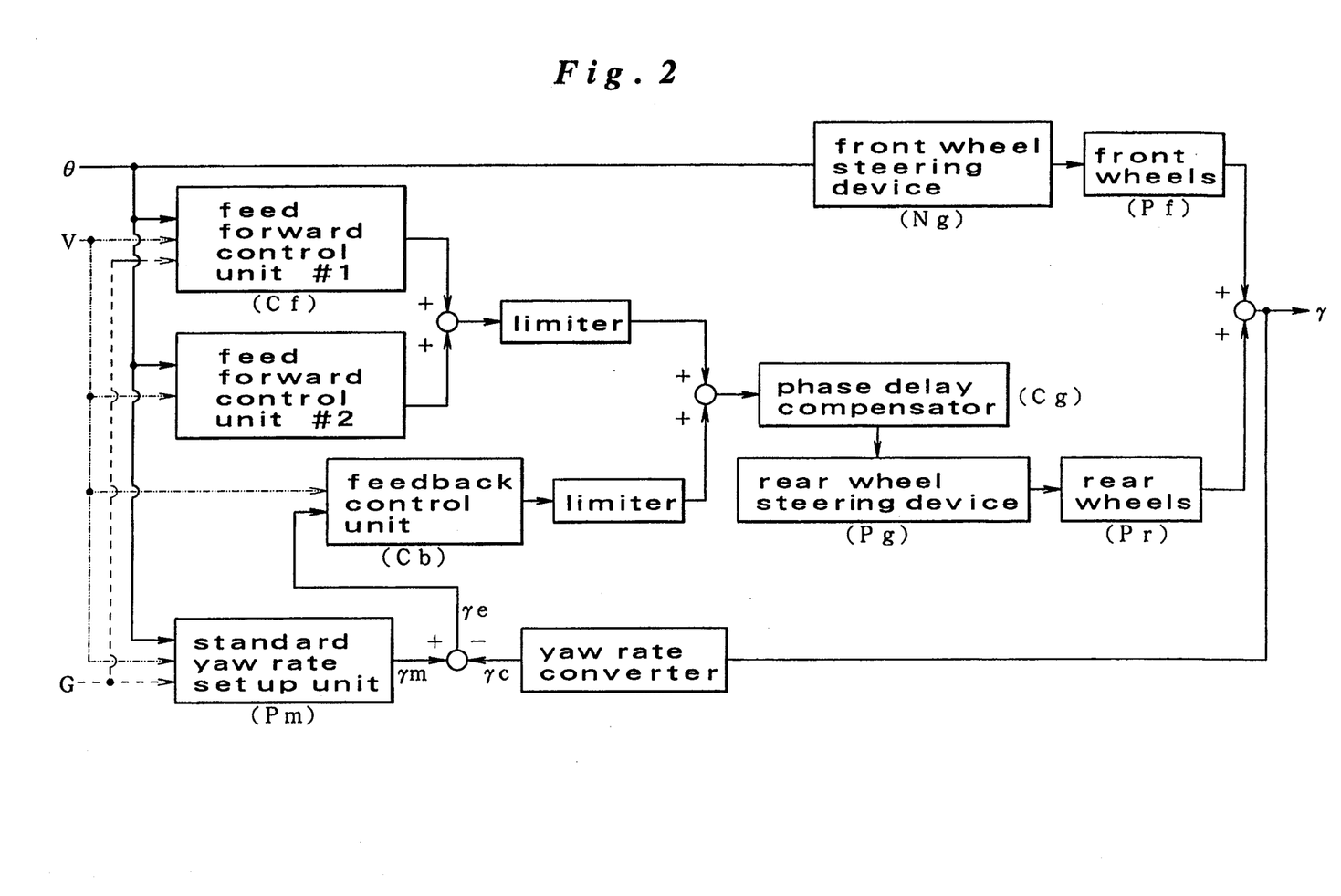
FIG. 2 is a block diagram showing the function of the control system according to the present invention.
Figure 3:
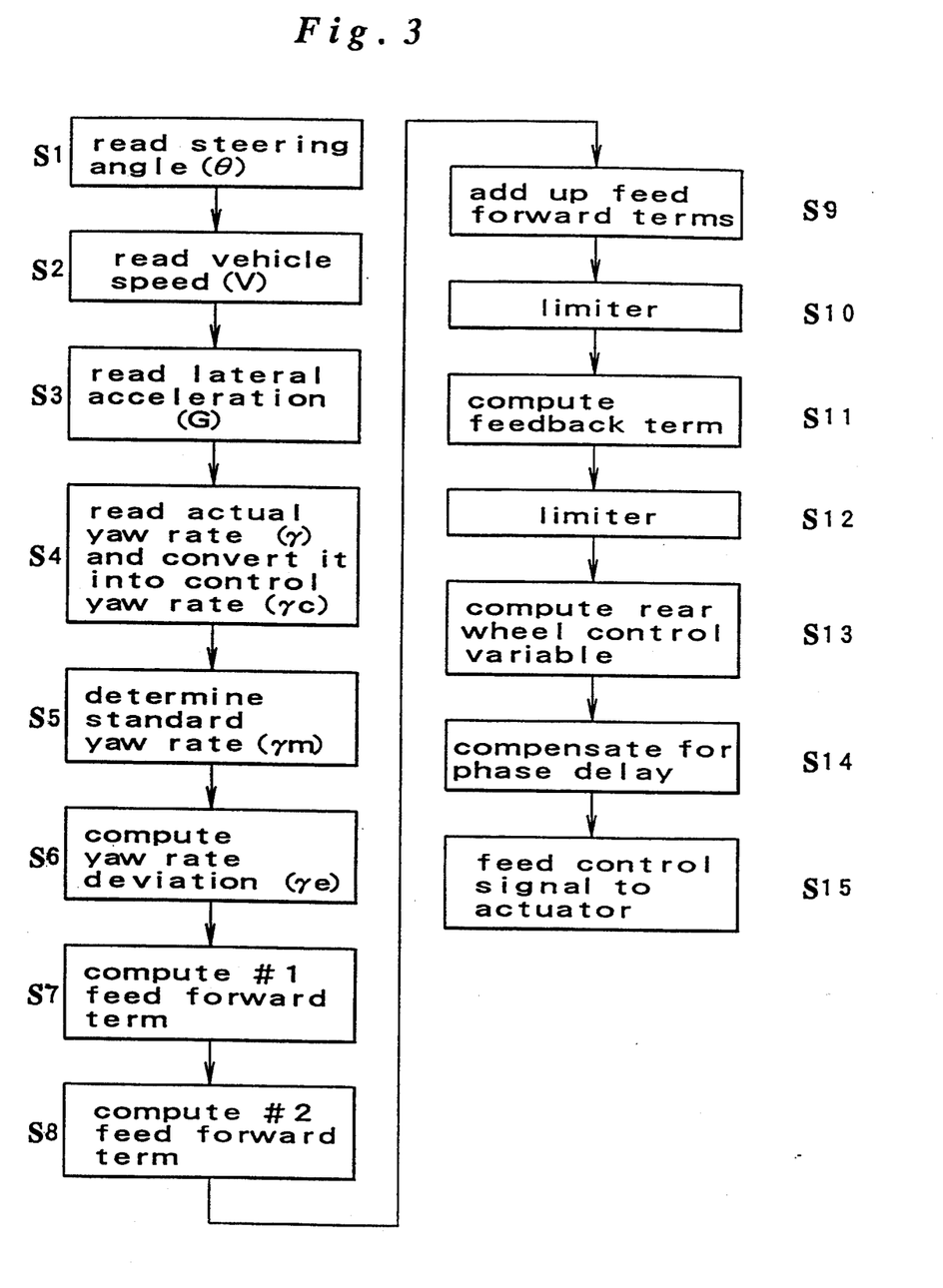
FIG. 3 is a flow chart showing the control flow of the control system according to the present invention.

In FIG. 2, $S(j\omega)$ and $T(j\omega)$ are given as follows.

$$S(j\omega)=1/(1+Cb\cdot Pr)$$

$$T(j\omega)=Pr\cdot Cb/(1+Cb\cdot Pr)$$

where Cb is the transfer function of the feedback control unit.

Figure 9:
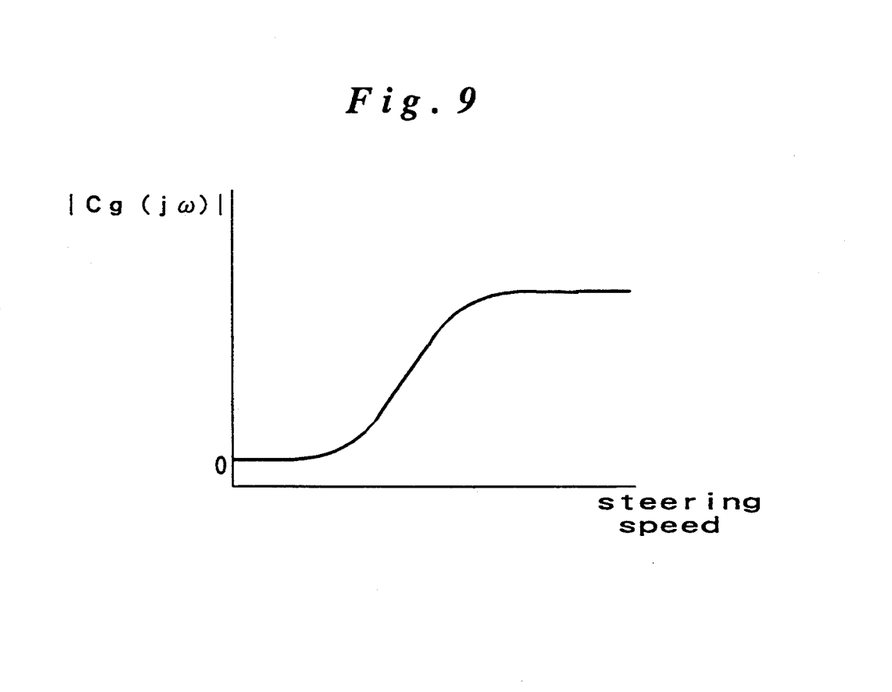
FIG. 9 is a graph showing the frequency depending compensation made on the response of the rear wheel steering device.

Then, the feed forward controlled variable and the feedback controlled variable are added up to compute the rear wheel steering angle controlled variable (step 13), and this variable is fed to a phase delay compensation circuit having the property shown in FIG. 9 to compensate for the phase delay caused by the rear wheel steering device (step 14), and to supply a controlled variable serving as a target value for the rear wheel steering angle to the rear wheel steering actuator control unit (step 15).

Figure 10:
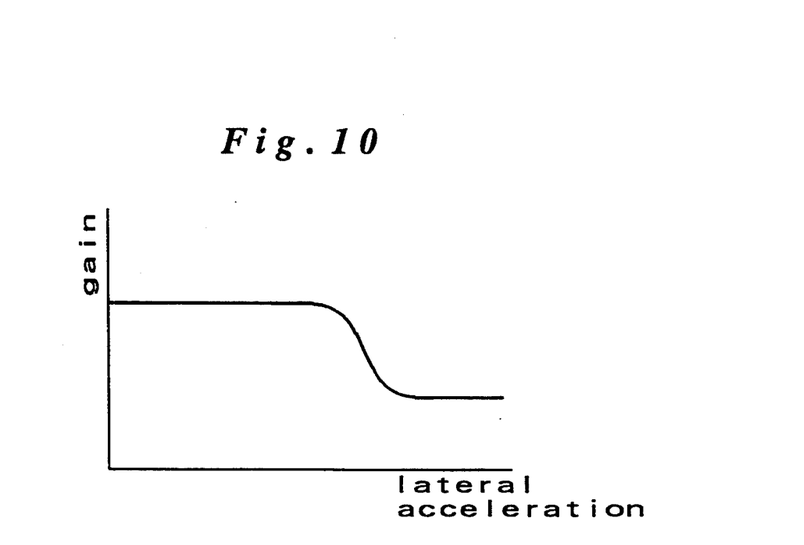
FIG. 10 is a graph showing the compensated yaw rate gain with respect to the lateral acceleration.

If the standard yaw rate is defined as a simple linear variable, the deviation from the actual yaw rate response becomes so excessive in the nonlinear range of the actual yaw rate response that the reverse phase steering angle produced in step 8 may become excessive, and the vehicle operator may feel uncomfortable. Therefore, with the increase in the lateral acceleration, the steady state gain of the standard yaw rate with respect to the steering wheel input is reduced for compensating this tendency as shown in FIG. 10.

Thus, according to the present invention, by combining feedback control and feed forward control, immunity from external disturbances and lateral stability can be both ensured each at a high level over the entire range of vehicle speed. By appropriately selecting the transfer function of the control system, it is possible to achieve desired responsiveness and stability. Furthermore, the vehicle response in the range where the cornering force of tires tends to saturate can be improved, and it is therefore possible to neutralize the steering property over the entire vehicle speed range.

Although the present invention has been described in terms of specific embodiments, it is possible to modify and alter details thereof without departing from the spirit of the present invention.

What we claim is:

1. A control system for a front and rear wheel steering vehicle having front wheels which are steered by turning of a steering wheel, and rear wheels which are automatically steered by a powered actuator according to an operating condition of said vehicle, comprising:

standard yaw rate determining means for determining a standard yaw rate according to a steering angle of said steering wheel;

actual yaw rate detecting means for detecting an actual yaw rate acting upon said vehicle;

computing means for computing a deviation between said standard yaw rate and said actual yaw rate;

feedback control means for controlling a steering angle of said rear wheels according to said deviation computed by said computing means; and feed forward control means for controlling, in cooperation with said feedback control means, said steering angle of said rear wheels according to said steering angle of said steering wheel.

2. A control system according to claim 1, wherein outputs of said feedback control means and said feed forward control means are combined as a rear wheel steering angle controlled variable, and said control system includes means for compensating the controlled variable for a phase delay of a rear wheel steering device.

3. A control system according to claim 1, wherein said feed forward control means compensates for a transfer function of said standard yaw rate determining means.

4. A control system according to claim 1, including means for adjusting a gain of a transfer function of said deviation with respect to said standard yaw rate to be relatively small in a low frequency range, and for adjusting a gain of a transfer function of said actual yaw rate with respect to said standard yaw rate to be relatively small in a high frequency range.

5. A control system according to claim 1, wherein said feed forward control means produces an output which steers said rear wheels in opposite phase to said front wheels when said steering angle of said steering wheel is greater than a certain level.

6. A control system according to claim 1, wherein said actual yaw rate detecting means includes means for removing a drift component from a detected value of yaw rate, said removing means being adjustable with respect to vehicle speed.

7. A control system according to claim 1, wherein said feed forward control means generates a first control variable pertaining to a relationship between angular movement of the steering wheel and a resulting yaw rate of the vehicle, and generates a second control variable pertaining to a direction of steering of the rear wheels in a large steering angle range.

8. A control system according to claim 7, wherein said first control variable compensates for a transfer function of the standard yaw rate determining means, said second control variable produces an output which steers said rear wheels in opposite phase to said front wheels once said steering angle of said steering wheel is greater than a certain level, and said feed forward control means combines said first and second control variables as a single output.

9. A control system according to claim 8, including means for detecting vehicle speed; and
said feed forward control means further includes means for limiting said single output according to the detected vehicle speed.

10. A control system for a front and rear wheel steering vehicle having front wheels which are steered by turning of a steering wheel, and rear wheels which are automatically steered by a powered actuator according to an operating condition of said vehicle, comprising:
standard yaw rate determining means for determining a standard yaw rate according to a steering angle of said steering wheel;
actual yaw rate detecting means for detecting an actual yaw rate acting upon said vehicle;
computing means for computing a deviation between said standard yaw rate and said actual yaw rate;
feedback control means for controlling a steering angle of said rear wheels according to said deviation computed by said computing means: and
means for reducing the gain of said standard yaw rate determining means when a lateral acceleration is greater than a predetermined level.

* * * * *

UNITED STATES PATENT AND TRADEMARK OFFICE
CERTIFICATE OF CORRECTION

PATENT NO. : 5,448,481
DATED : September 5, 1995
INVENTOR(S) : Nobuyoshi Asanuma, Kiyoshi Wakamatsu, Manabu Ikegaya It is certified that error appears in the above-indentified patent and that said Letters Patent is hereby corrected as shown below:

Column 1, line 63, after "rate" insert a semicolon.

Column 2, line 37, change "wheels" to —wheel—.

Column 3, line 46, delete "10".

Signed and Sealed this

Twentieth Day of February, 1996

BRUCE LEHMAN

Attest:

*Attesting Officer*       *Commissioner of Patents and Trademarks*